(12) United States Patent
Foster

(10) Patent No.: US 7,510,071 B2
(45) Date of Patent: Mar. 31, 2009

(54) RECIPROCATING SLAT CONVEYOR WITH CLEANOUT APPARATUS

(76) Inventor: Raymond Keith Foster, P.O. Box 1, Madras, OR (US) 97741

( * ) Notice: Subject to any disclaimer, the term of this patent is extended or adjusted under 35 U.S.C. 154(b) by 0 days.

(21) Appl. No.: 12/220,281

(22) Filed: Jul. 23, 2008

(65) Prior Publication Data

US 2008/0283365 A1    Nov. 20, 2008

(51) Int. Cl.
*B65G 25/04* (2006.01)
(52) U.S. Cl. ............... 198/750.2; 198/750.3; 414/525.1
(58) Field of Classification Search ............. 198/750.2, 198/750.3, 750.4, 750.5, 494, 497–499; 414/525.1, 414/525.9; 56/400.01
See application file for complete search history.

(56) References Cited

U.S. PATENT DOCUMENTS

| 3,678,670 | A | * | 7/1972 | Welz | 56/400.14 |
|---|---|---|---|---|---|
| D274,118 | S | * | 6/1984 | Cochrane | D8/13 |
| D282,621 | S | * | 2/1986 | Nuorivaara | D8/13 |
| 4,602,998 | A | * | 7/1986 | Goron | 210/396 |
| 4,856,645 | A | * | 8/1989 | Hallstrom, Jr. | 198/750.4 |
| 4,944,386 | A | * | 7/1990 | Swinderman | 198/499 |
| 5,323,894 | A | * | 6/1994 | Quaeck | 198/750.3 |
| 5,875,881 | A | * | 3/1999 | Brink | 198/499 |
| 5,993,772 | A | * | 11/1999 | Ninane et al. | 423/432 |
| 6,019,215 | A | * | 2/2000 | Foster | 198/750.3 |
| 6,033,179 | A | * | 3/2000 | Abbott | 414/527 |
| 6,129,299 | A | * | 10/2000 | Jackson et al. | 241/185.5 |
| 6,257,396 | B1 | * | 7/2001 | Quaeck | 198/750.3 |
| 6,357,578 | B1 | * | 3/2002 | Shelby | 198/750.2 |
| 6,408,606 | B1 | * | 6/2002 | Hsu | 56/400.04 |
| 6,739,447 | B2 | * | 5/2004 | Verhaeghe | 198/750.1 |
| 6,782,994 | B1 | * | 8/2004 | Foster | 198/750.2 |
| 6,851,254 | B1 | * | 2/2005 | Dalfors | 56/400.08 |
| D509,415 | S | * | 9/2005 | Crites et al. | D8/13 |
| 6,974,296 | B2 | * | 12/2005 | Simrin | 414/525.1 |
| 6,983,584 | B1 | * | 1/2006 | Huang | 56/400.12 |
| 7,131,526 | B2 | * | 11/2006 | Foster | 198/750.2 |
| 7,162,857 | B1 | * | 1/2007 | Gagne | 56/400.07 |

OTHER PUBLICATIONS

US PG PUB US2006/0182576A1 Aug. 17, 2006, Foster.*

* cited by examiner

*Primary Examiner*—Douglas A. Hess

(57) ABSTRACT

A plow (P) sits down on movable slats (10) of a reciprocating slat conveyor formed of the movable slats (10) and fixed slats (12) which are between the movable slats (10). The movable slats (10) and fixed slats (12) define valley regions between the movable slats (10). The plow (P) has fingers (92, 106) which extend into the valley regions. During the unloading operations, the plow (P) is moved rearwardly by the moveable slats (10), together with the load (L) that is on the conveyor. When the plow (P) reaches the rear end of the conveyor, it tips rearwardly and discharges the remaining portions of the load (L) off from the conveyor. Then, a teather (T) is wound onto a winch and used for pulling the plow (P) forwardly back into a forward parked position (FIG. 15).

37 Claims, 18 Drawing Sheets

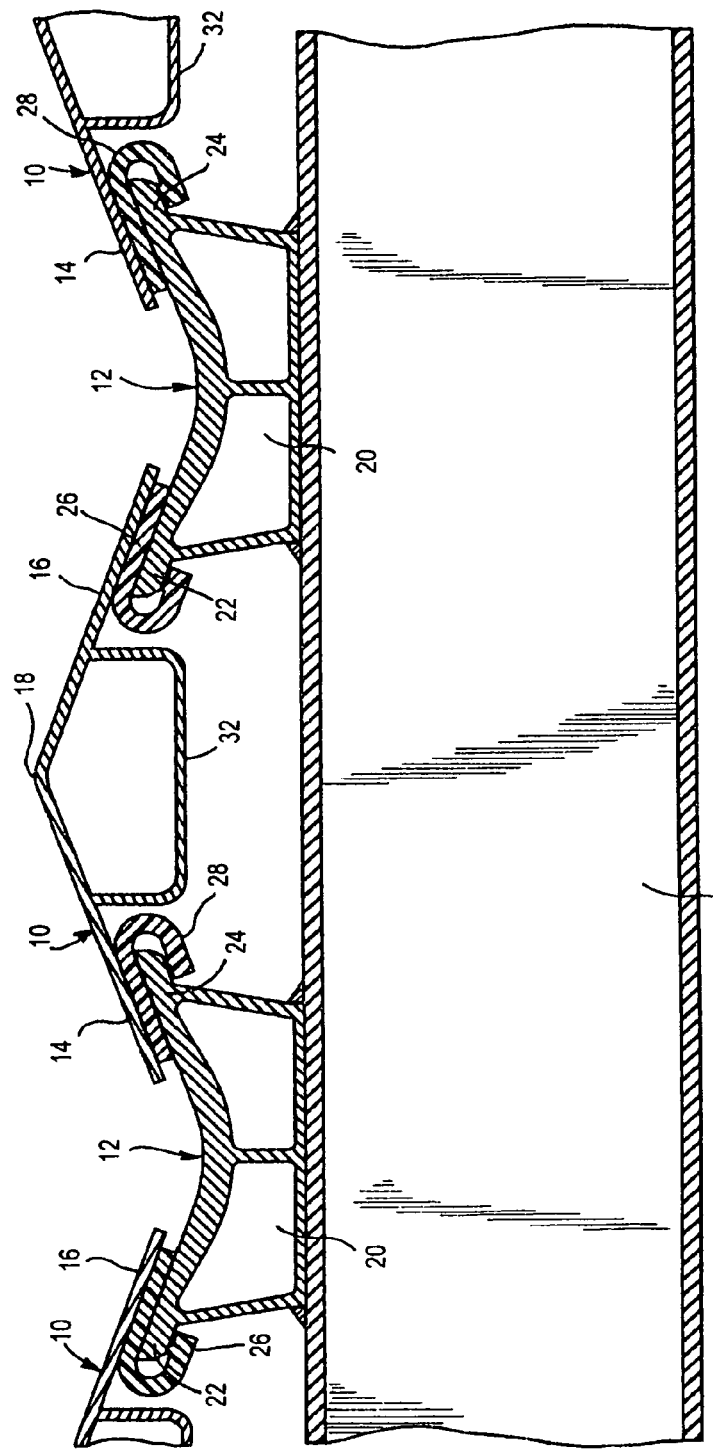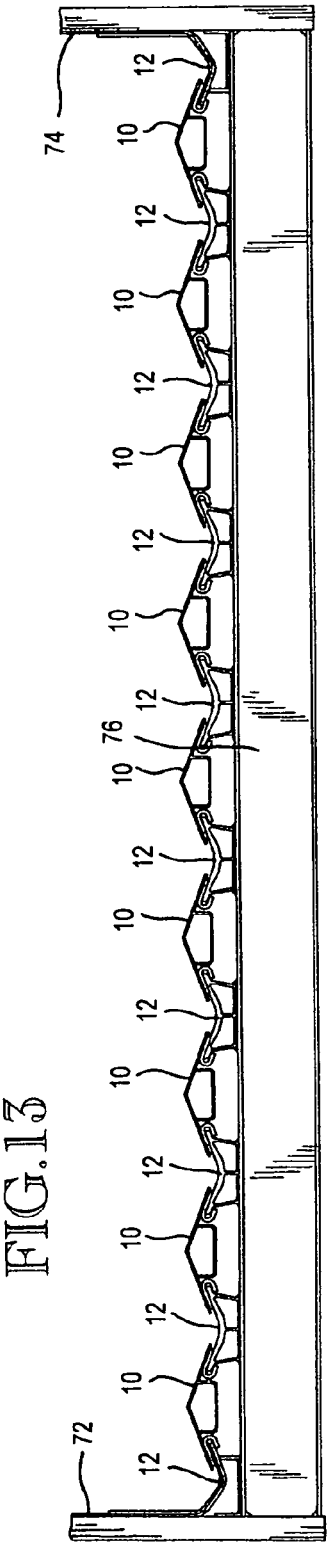

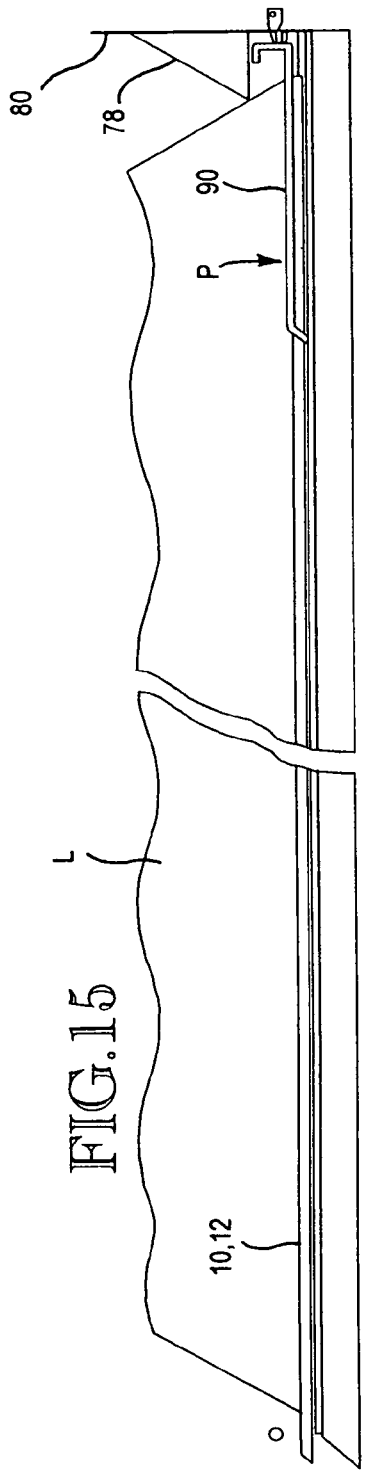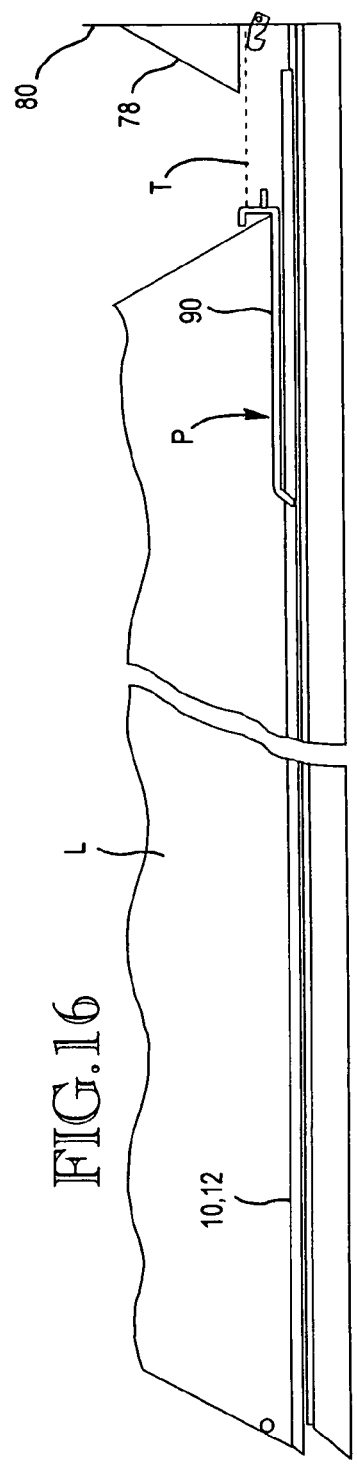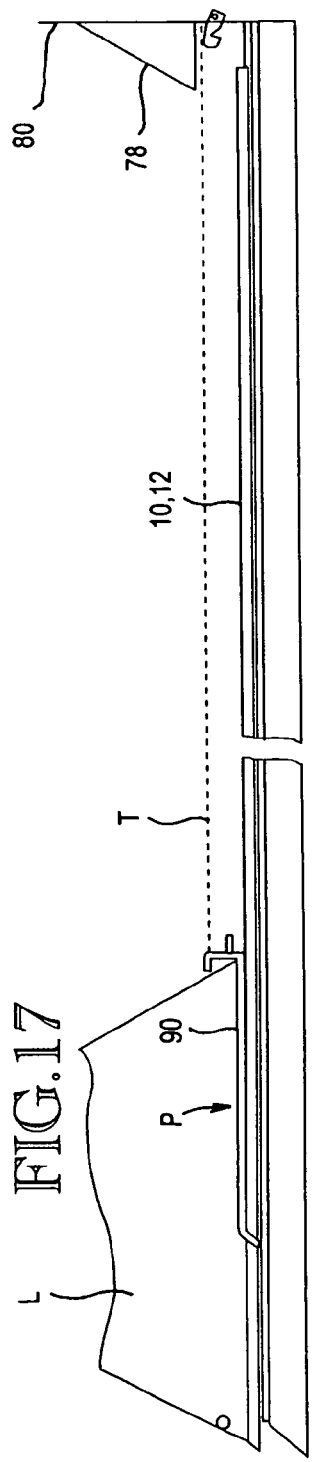

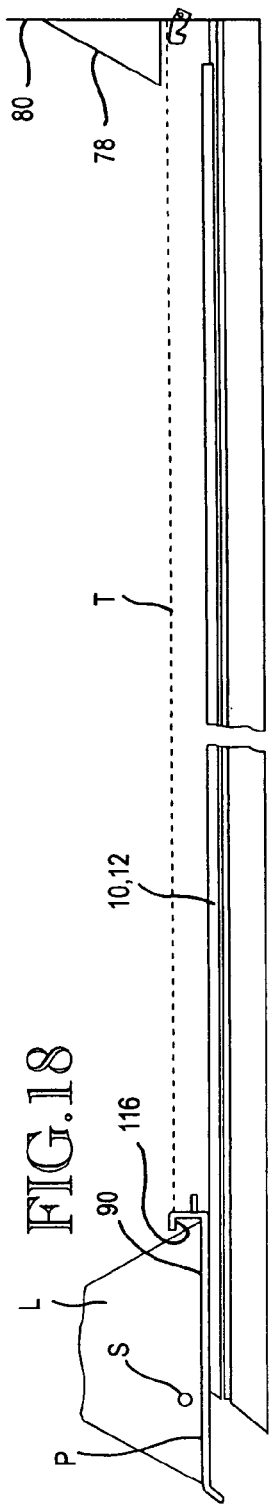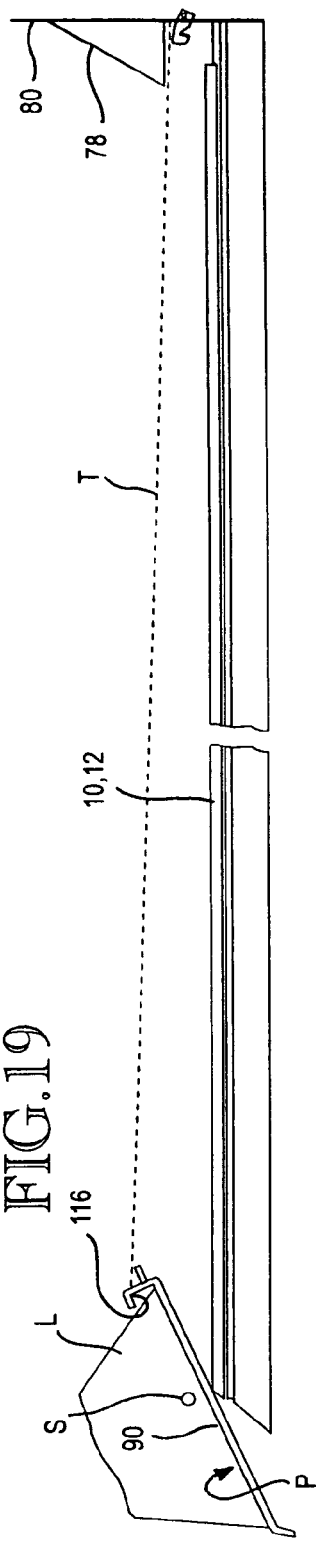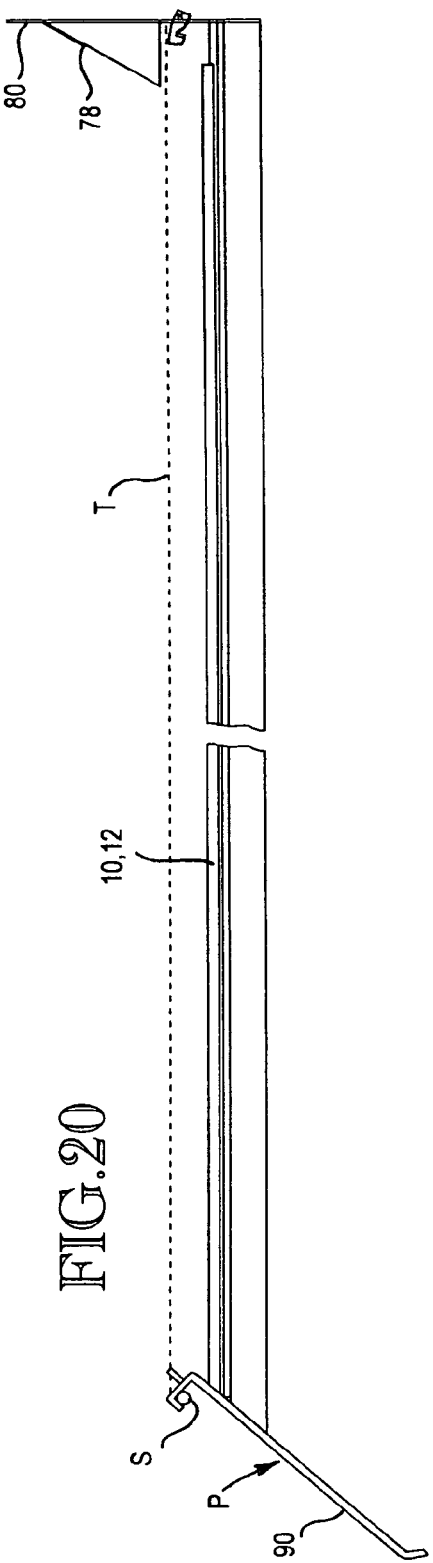

RECIPROCATING SLAT CONVEYOR WITH CLEANOUT APPARATUS

TECHNICAL FIELD

This invention relates to a reciprocating slat conveyor of the type disclosed in my U.S. Pat. No. 6,848,569, filed Jan. 14, 2004, and entitled Reciprocating Slat Conveyor With Fixed And Movable Slats. More particularly, it relates to an apparatus for sweeping the conveyor during conveyor use for conveying bulk material, for minimizing the amount of residual bulk material remaining on the conveyor after use.

BACKGROUND OF THE INVENTION

My U.S. Pat. No. Re. 33196, granted Apr. 10, 1990, my U.S. Pat. No. 4,923,356, granted May 8, 1990, and my aforementioned U.S. Pat. No. 6,848,569, disclose reciprocating slat conveyors that are adapted to handle heavy bulk loads, including garbage, scrap metal, and other materials. These conveyors are characterized by laterally spaced apart movable conveyor slats and laterally spaced apart valley regions between the movable slat conveyors. These conveyors are adapted to withstand heavy bulk material being dropped onto them.

There is a need for cleaning these conveyors as they are being operated to remove material. U.S. Pat. No. 6,033,179, granted Mar. 7, 2000, to William S. Abbott, discloses a clean out mechanism that is usable with reciprocating slat conveyors that are composed of contiguous slats having coplanar upper surfaces. This mechanism of this patent is not suitable for cleaning out a reciprocating slat conveyor that is composed of laterally spaced apart movable slats with valley regions between the movable slats, such as disclosed in my U.S. Pat. No. 6,848,569. A principal object of the present invention is to provide a clean out apparatus that is usable for sweeping clean the movable slats and fixed valley regions between the slats which make up the conveyor disclosed by my U.S. Pat. No. 6,848,569, and/or in similar conveyors.

BRIEF SUMMARY OF THE INVENTION

The sweeping apparatus of the present invention is herein sometimes referred to as a "cleaning plow." It is usable to sweep clean a reciprocating slat conveyor that includes movable slats having longitudinal valley regions between adjacent slats. The cleaning plow of the present invention is basically characterized by a rigid body that is adapted to extend across the conveyor and sit down on the slats. The body includes fingers adapted to extend downwardly from the body into the valley regions between the slats. When the conveyor is operated to move a load in a discharging direction, the cleaning plow is moved with the slats and the fingers move material that is in the valley regions longitudinally of the valley regions and eventually all from the discharge end of the conveyor. The plow fingers have side and bottom edges that are adapted to be contiguous side and bottom surfaces of the valley regions when the plow is on the conveyor.

In preferred form, the rear end of the plow includes fingers that slope downwardly and rearwardly from the plow.

In preferred form, the fingers are spring loaded into contact with valley regions so that as the plow moves in the unloading direction the fingers push the material that is in the valley regions ahead of them along the valley regions and eventually off from the conveyor.

In preferred form, the cleaning plow includes a rigid body having a substantially horizontal central portion that is between front end fingers and rear end fingers, each of which extend downwardly into valley regions between the conveyor slats.

Preferably, the conveyor has a rear end portion and at least one stop adjacent the rear end portion. The cleaning plow has a front end portion positioned to contact the stop when the cleaning plow is at the rear of the conveyor. When the front end portion of the cleaning plow is in contact with the stop, the cleaning plow is adapted to extend rearwardly from the rear end of the conveyor and slope outwardly and downwardly from the rear end of the conveyor. This allows material on the cleaning plow to slide down the cleaning plow and outwardly from the conveyor.

According to another aspect of the invention, the conveyor has a front end wall and a downwardly and rearwardly sloping baffle on the front wall. When the cleaning plow is at a forward position in the conveyor, a forward portion of it is under the baffle and a rearward portion extends rearwardly from the baffle. When material is deposited on to the conveyor, the baffle will guide the material downwardly onto the rear portion of the cleaning plow and onto the conveyor slats rearwardly of the cleaning plow. When the conveyor is operated to move the load rearwardly, the cleaning plow is moved rearwardly by the movable slats, behind the load, with its fingers down in the valley regions between the slats. A tether may be attached to the plow and extend from it to a winch at the front end of the conveyor. Once the cleaning plow has performed the clean out function, and is at the rear end of the conveyor, the tether can be wound onto the winch and used for moving the cleaning plow forwardly in the conveyor back into a position partially below the front end baffle.

The various features and aspects of the invention can be used together or separately. Also, other objects, advantages and features will become apparent from the description of the best mode set forth below, from the drawings, and from the claims and principals that are embodied in this specific structures that are illustrated and described.

BRIEF DESCRIPTION OF THE SEVERAL VIEWS OF THE DRAWINGS

In the drawing, like reference numerals designate like parts throughout the several views, and:

FIG. 12 is a fragmentary cross sectional view through the conveyor, showing movable slats in the form of box beams and fixed slats between the movable slats also in the form of box beams;

FIG. 13 is a smaller scale view like FIG. 12 but extending the full width of the trailer and conveyor;

FIG. 15 is a side elevational view in schematic form of an embodiment of the invention, showing a cleaning plow in a forward position and a load of bulk material on the conveyor slats and the rearward portion of the cleaning plow;

FIG. 16 is a view like FIG. 15, showing the load and the cleaning plow being moved rearwardly by operation of the conveyor, such view also including the broken line showing of a tether that is connected to the front end of the cleaning plow and extends forwardly through an opening in the front wall of the trailer, to a wench that is not shown;

FIG. 17 is a view like FIGS. 15 and 16, but showing the cleaning plow moved further to the rear of the conveyor;

FIG. 18 is a view like FIGS. 15-17, showing the cleaning plow substantially at the rear end of the conveyor;

FIG. 19 is a view like FIGS. 15-18, showing the cleaning plow in the process of tipping downwardly at its rear so that the remainder of the load that is on it will slide off of the cleaning plow;

FIG. 20 is a view like FIGS. 15-19, showing the cleaning plow in a fully tipped position;

DETAILED DESCRIPTION OF THE ILLUSTRATED EMBODIMENT

Figure 1:
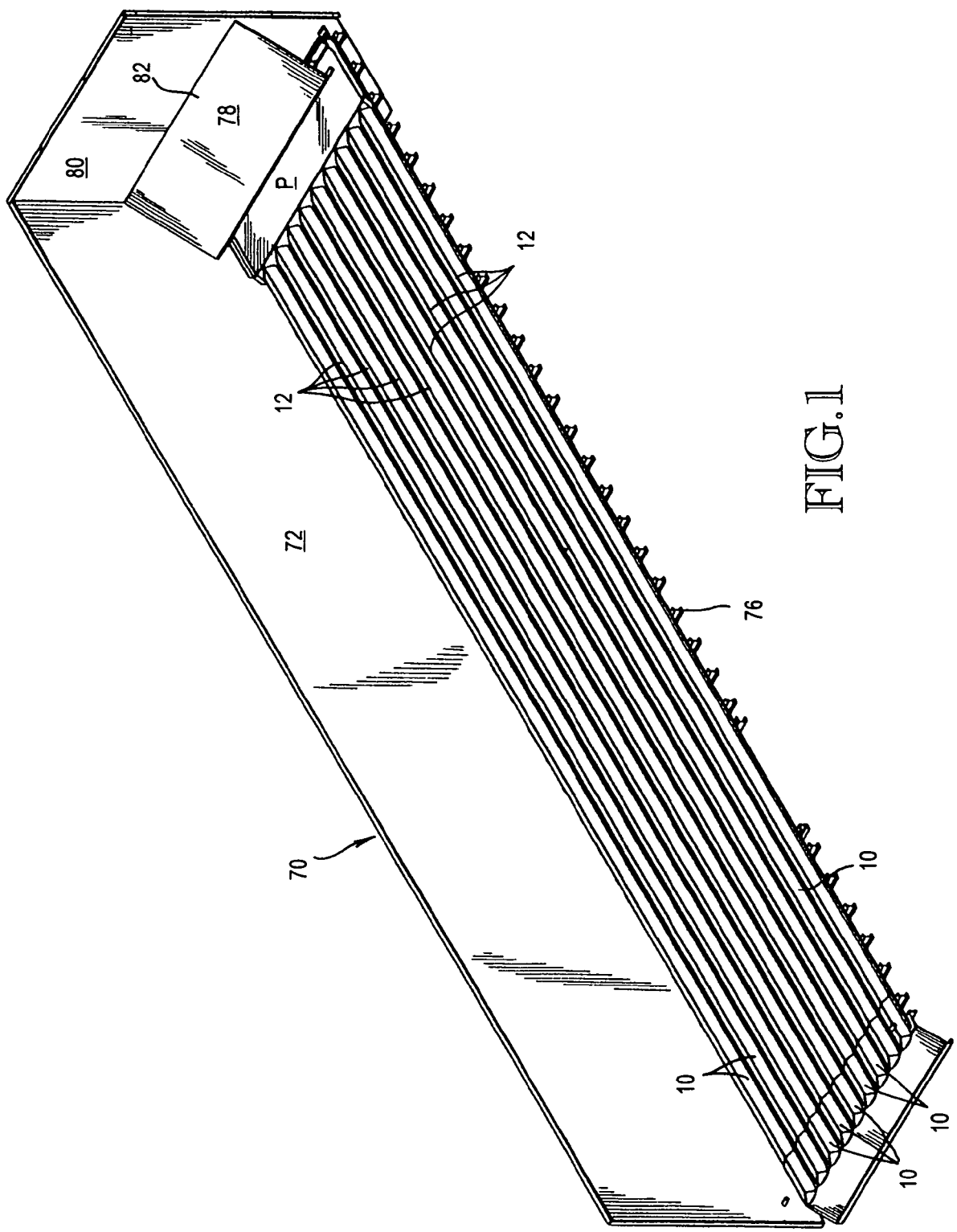
FIG. 1 is a fragmentary pictorial view taken from above looking down towards the top, the passenger side and the rear end of a trailer which includes a cleaning plow embodiment of the invention, such view showing the cleaning plow parked in a forward position below a baffle that slopes downwardly and rearwardly from the front wall of the trailer.

My aforementioned U.S. Pat. No. 6,848,569 discloses a reciprocating slat conveyor within a container that receives bulk material. The conveyor extends substantially the full length of the container. An embodiment of this conveyor is disclosed herein. It includes movable conveyor slats 10 that are laterally spaced apart and fixed conveyor slats 12 that are laterally spaced apart and are between the movable slats 10. In the embodiment illustrated herein, the movable slats 10 are V-shaped in cross section and are composed of side portions 14, 16 that slope outwardly and downwardly from an apex 18 and together form a top wall 14, 16. See FIG. 12.

Fixed slats 12 may be top walls of laterally spaced apart beams 20. having upper side portions 22, 24 that provide support for bearings 26, 28. Beams 20 may be continuous members extending substantially the full length of the conveyor. Or, they can be a plurality of shorter members arranged end-to-end, with or without spaces between the members. Bearings 26, 28 are continuous members or are shorter members that are positioned end-to-end so that together they extend substantially the full length of the conveyor.

Each pair of adjacent beams 20 define a space between them in which a central portion of a movable conveyor slat 10 is received. This movable central portion may comprise a U-shaped reinforcement member 32 that has sidewalls and a bottom wall. The tops of the sidewalls are connected to the floor member 14, 16, such as by welding. Preferably member 32 extends the full length of the slat 10. Each movable slat 10 also includes retainer members 34 having opposite side portions that are in effect leaf springs. The members may be relatively short in length and be longitudinally spaced apart along the slats 10. Nut and bolt assemblies are used to secure the bottom members 34 to the bottom wall of the reinforcement member 32. This is disclosed in detail in my U.S. Pat. No. 6,848,569, the contents of which are incorporated herein, by this specific reference to such application.

Figure 2:
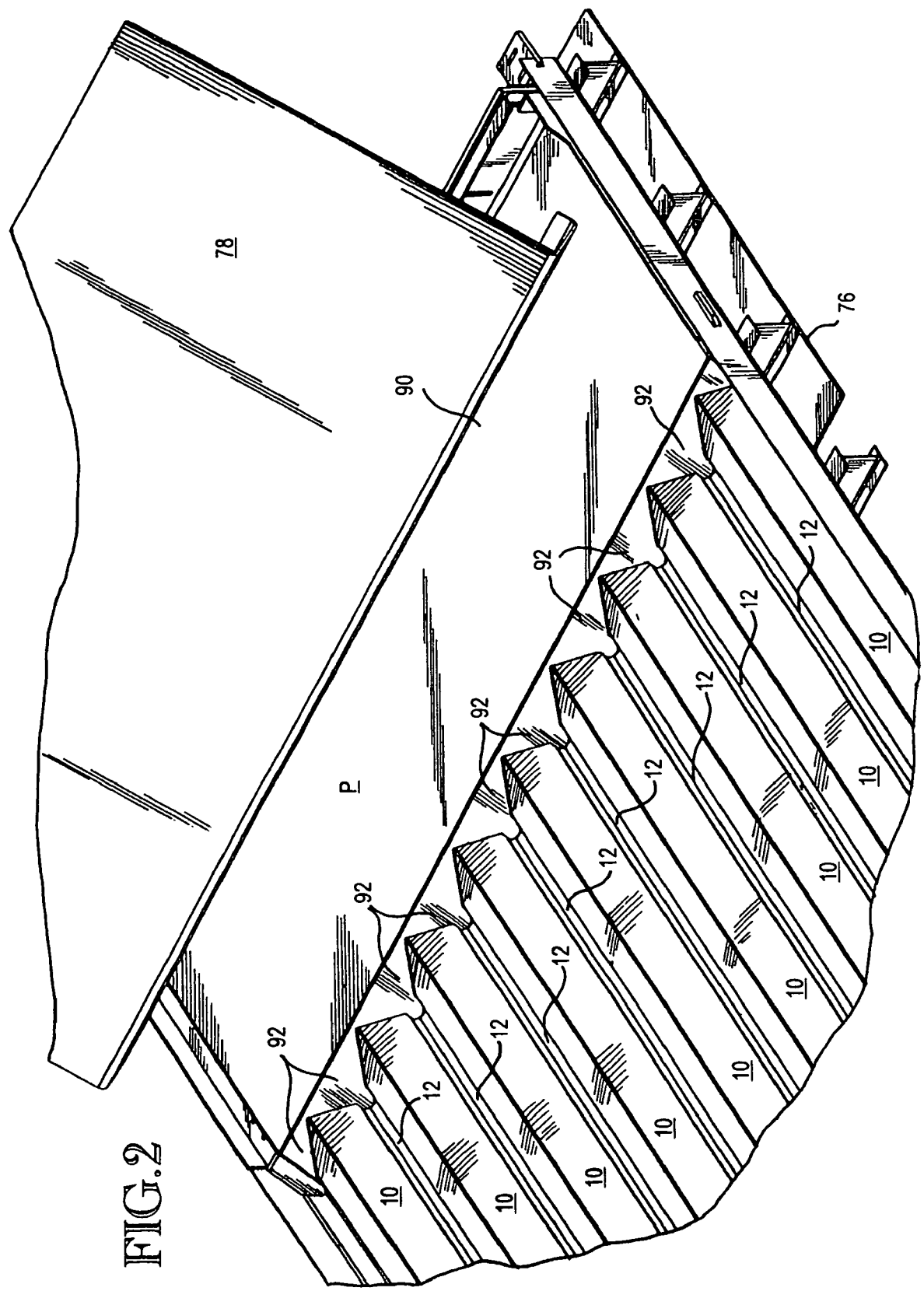
FIG. 2 is an enlarged scale fragmentary view of the front end portion of the trailer, also showing the cleaning plow in a parked forward position.

Bearings 26, 28 include upper surfaces that are contacted by the side portions of the slat wall 14, 16. Bearings 26, 28 also include lower bearing surfaces. The side parts of the retainer members 34 have upper surfaces that confront the lower bearing surfaces. Preferably, the side portions of the bottom members are spring loaded against the bottom bearing surfaces, as disclosed in U.S. Pat. No. 6,848,569. As best shown by FIG. 12, the fixed slats 12 extend laterally between adjacent bearings 26, 28. In the illustrated embodiment, the fixed slats 12 have a shallow V-shaped cross section with a central valley portion. According to an aspect of the invention, every third movable conveyor slat 10, laterally across the width of the conveyor, is connected to one of three transverse support beams 55, 56, 57. In FIGS. 1 and 2, one of the support beams is designated 56. One of the movable conveyor slats 10 is shown connected to a transverse drive beam 56 by a clamp structure that is like one of the clamp structures disclosed in the aforementioned U.S. Pat. No. 6,848,569.

Figure 14:
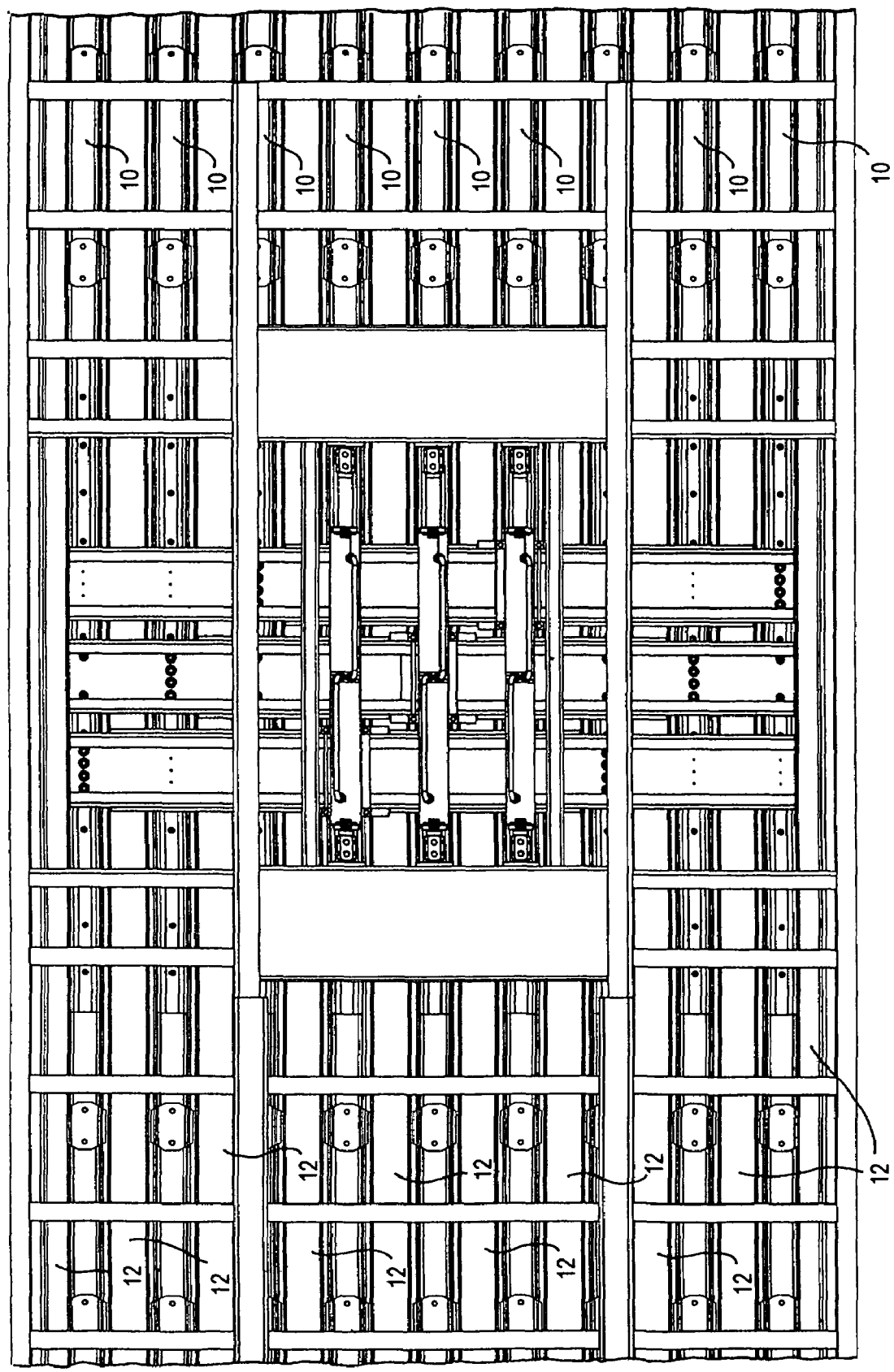
FIG. 14 is a bottom plan view looking upwardly towards the frame work that forms the bottom portion of the conveyor, showing an embodiment of a drive assembly for moving the movable slats of the conveyor.
Figure 21:
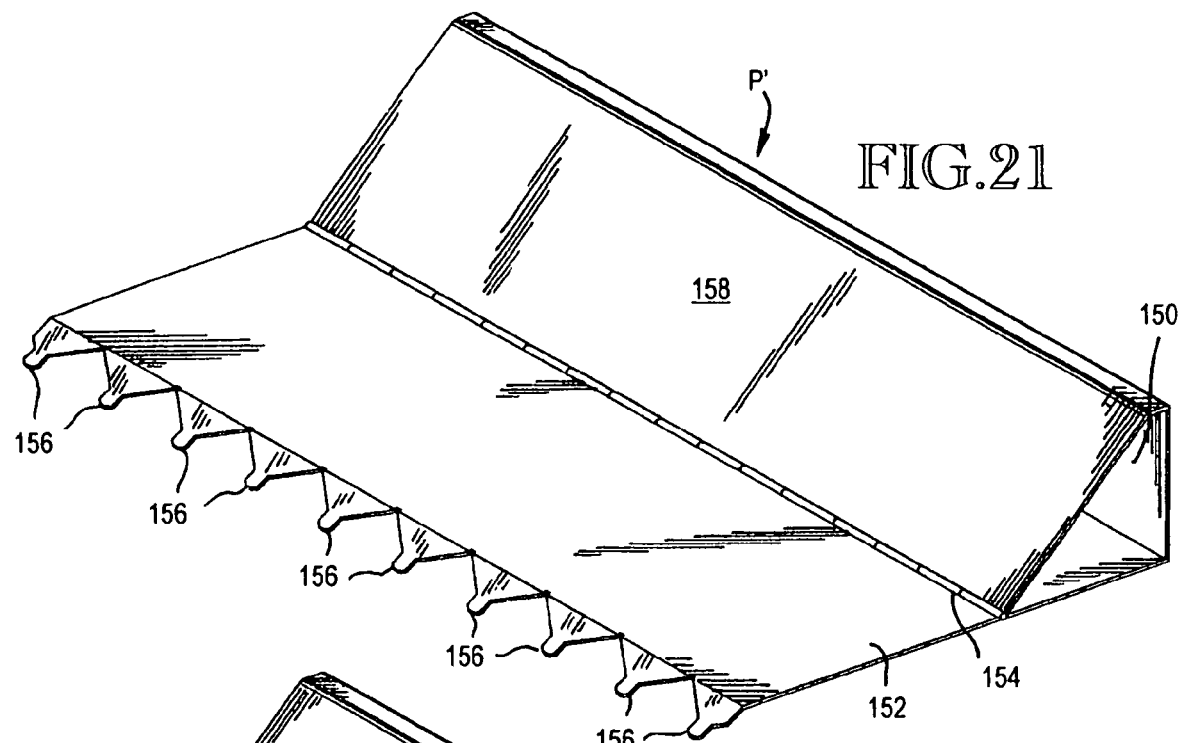
FIG. 21 is a pictorial view of a modified form of the cleaning plow, such view been taken from above and looking down towards the top, rear edge and passenger side of the plow.
Figure 22:
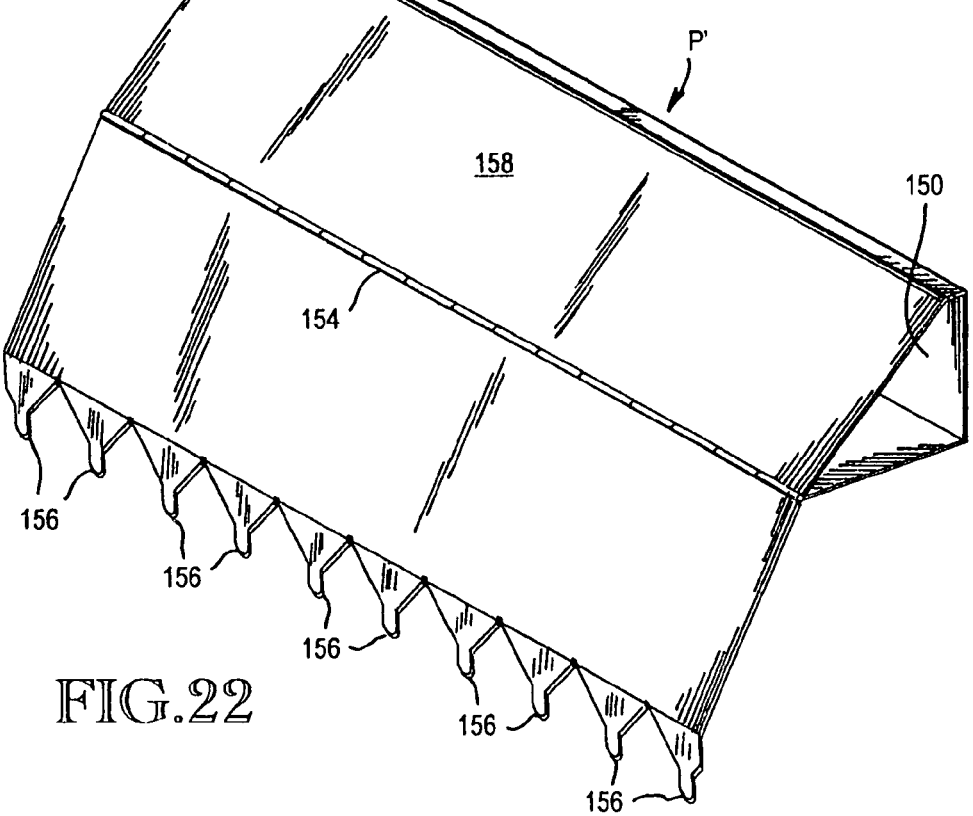
FIG. 22 is a view like FIG. 21, but showing a rearward portion of the cleaning plow swung downwardly from the position that it is in FIG. 21, about a transverse hinge.

As is well known in the art, a separate linear hydraulic motor is connected to each transverse drive beam. FIG. 14, for example, shows a Running Floor II® drive assembly connected to the moveable slats. This assembly is described in detail in my U.S. Pat. No. 4,748,893, the contents of which are incorporated herein by this specific reference to that patent. In a conveyor that includes three transverse drive beam, there are three linear hydraulic motors. The movable components of the linear hydraulic motors are connected to the transverse drive beams. The stationary components are connected to a portion of the frame structure in which the conveyor is supported. Alternatively, the movable components of the linear hydraulic motors may be connected to portions of three different movable conveyor slats, one from each of the three sets of movable conveyor slats. Then, the conveyor slats for each set can be connected together by a transverse drive beam that is spaced axially from the linear hydraulic motors. In this embodiment, the transverse drive beam serves to connect the driven slat (the slat that is connected to the linear hydraulic drive motor) to the remaining slats of the set.

Figure 3:
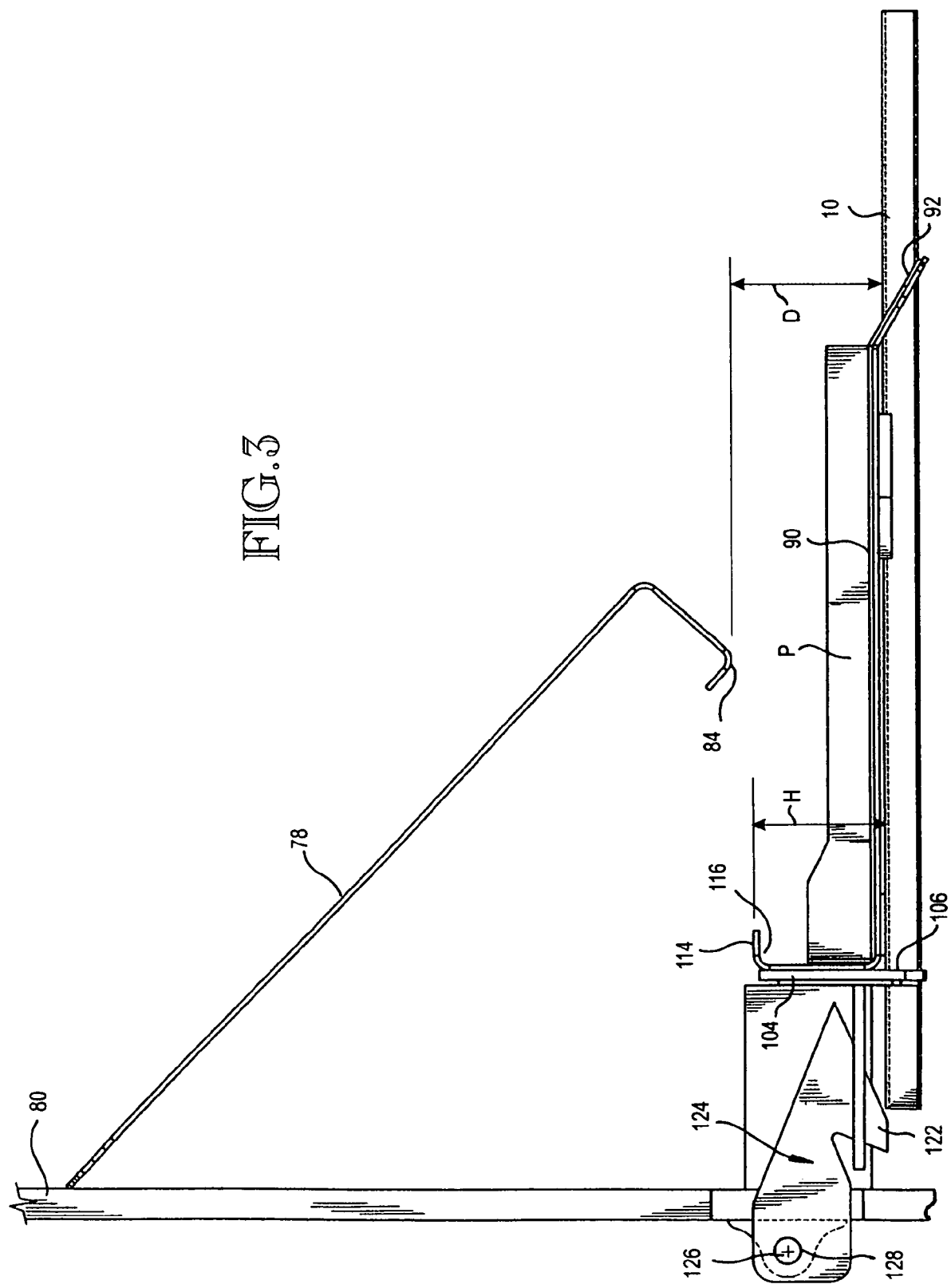
FIG. 3 is an enlarged scale, fragmentary, longitudinal sectional view taken at the front end of the trailer, showing the cleaning plow in its parked position.
Figure 4:
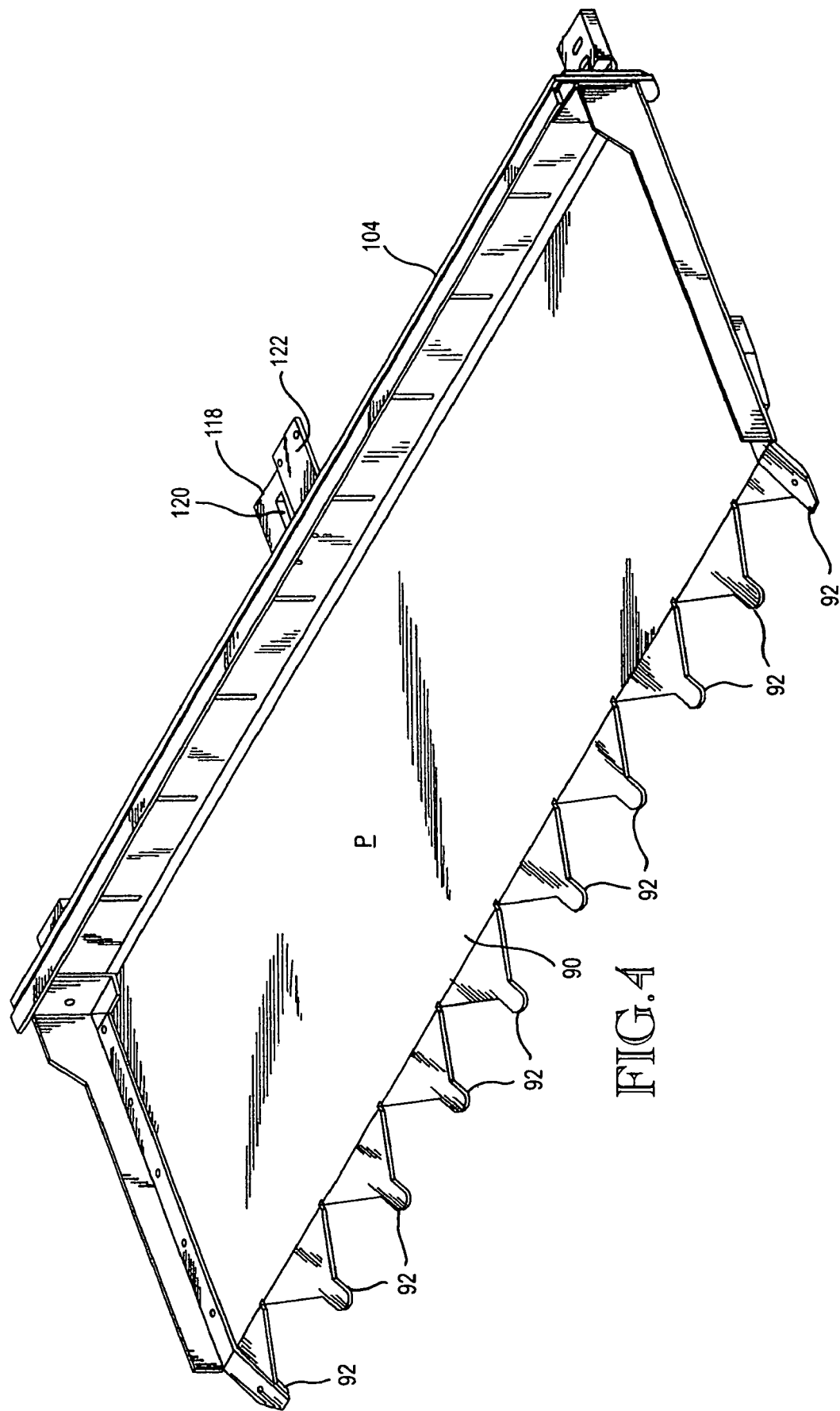
FIG. 4 is a pictorial view looking down from above towards the top, the rear end and the driver's side of a preferred embodiment of the cleaning plow.
Figure 5:
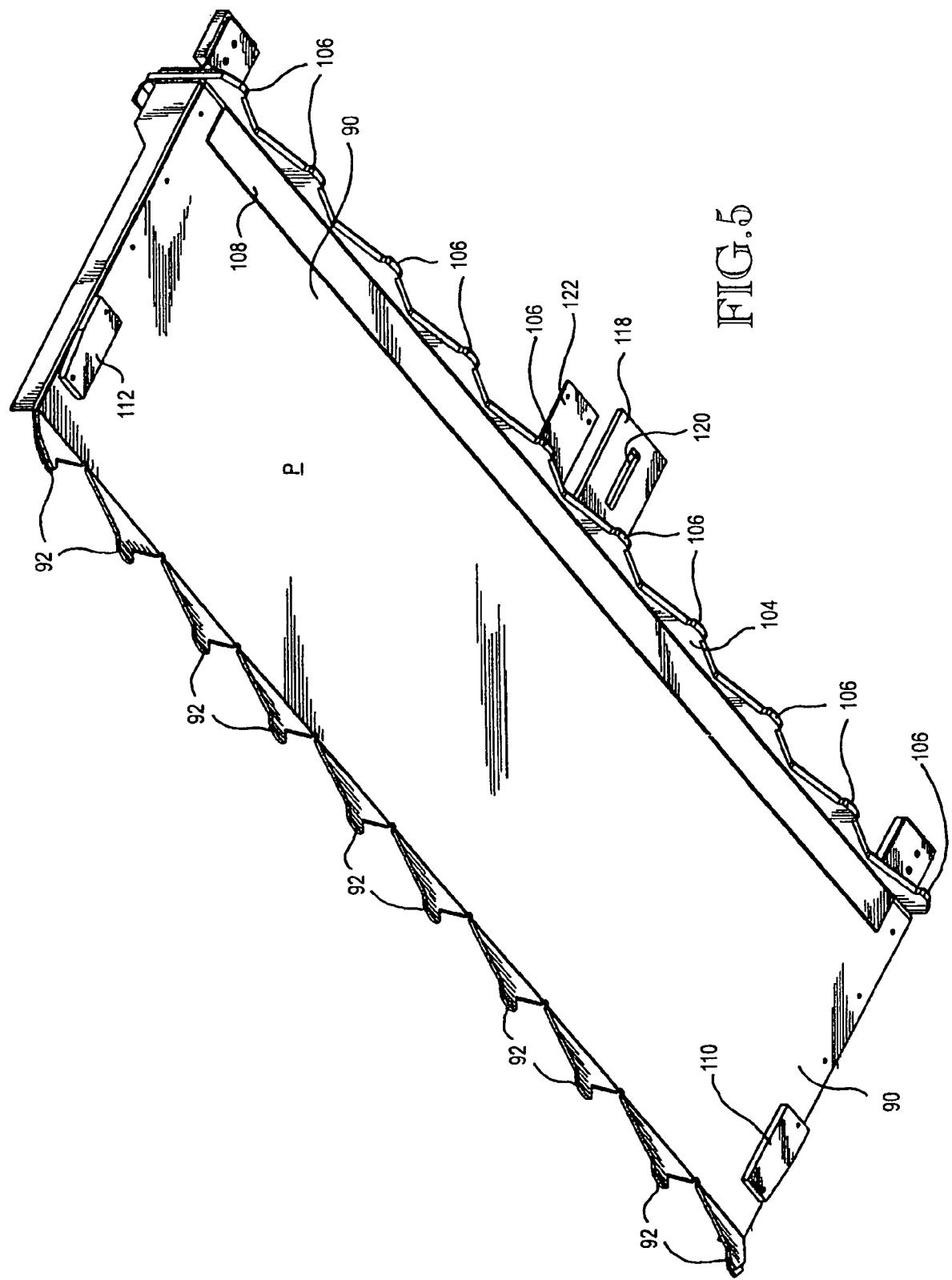
FIG. 5 is a pictorial view taken from below and looking up towards the bottom, the rear end and the passenger side of the cleaning plow of FIG. 4.
Figure 7:
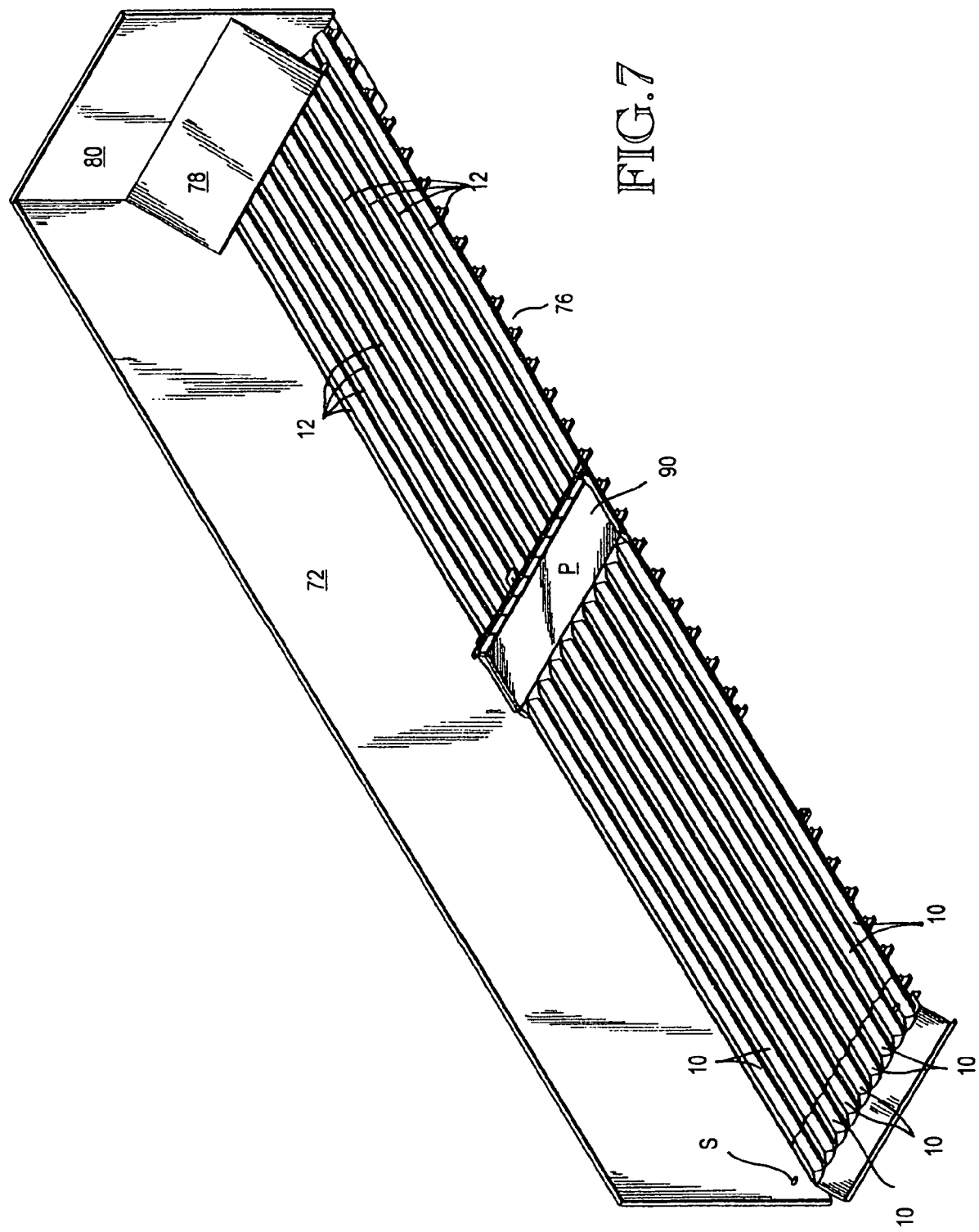
FIG. 7 is a view like FIG. 1 but showing the sweeping plow in an intermediate position between the front and rear ends of the conveyor.
Figure 8:
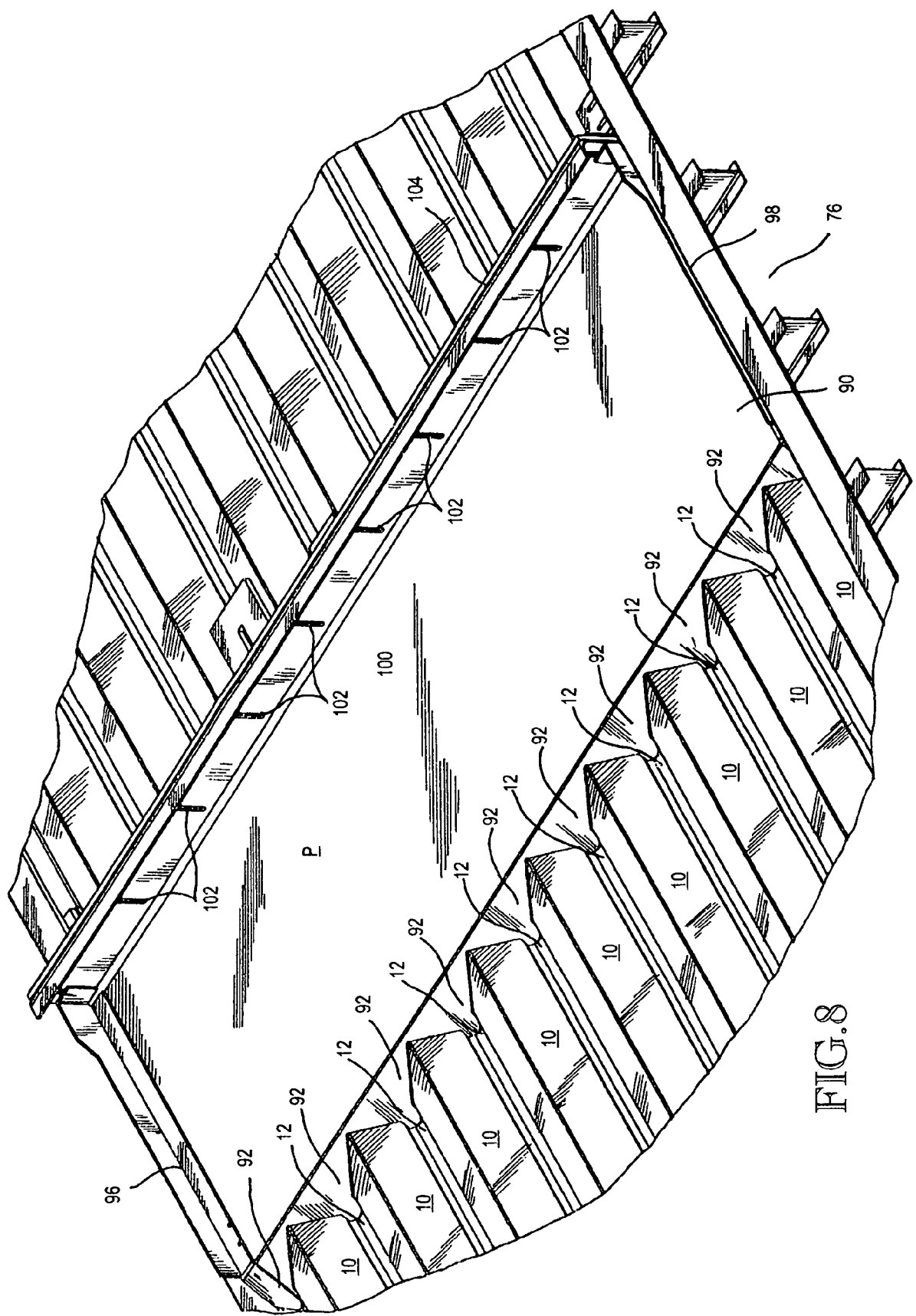
FIG. 8 is a view like FIG. 2 but showing the sweeping plow in the position shown by FIG. 7.
Figure 9:
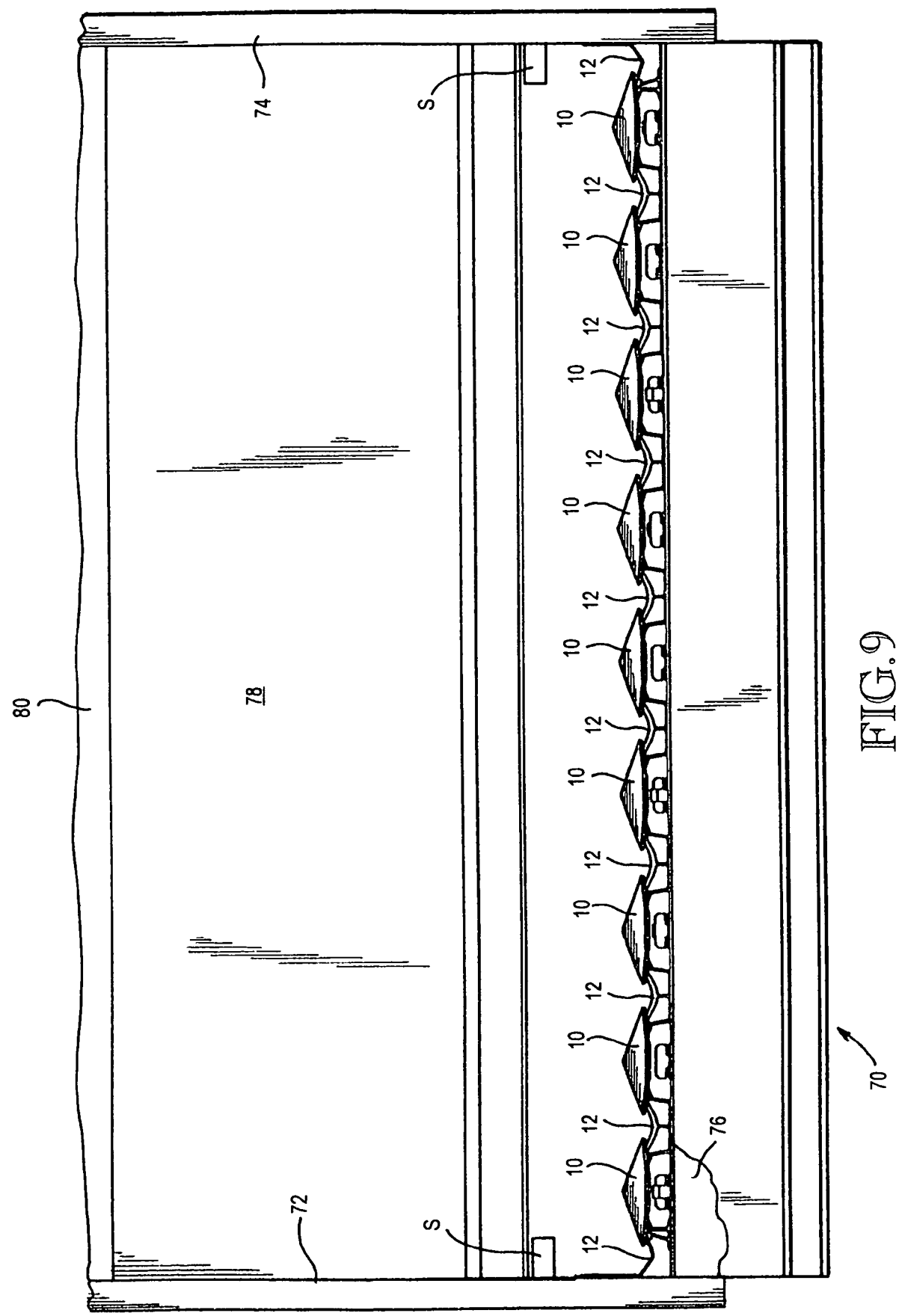
FIG. 9 is a rear end elevational view of the trailer and conveyor shown by FIGS. 1 and 7.
Figure 10:
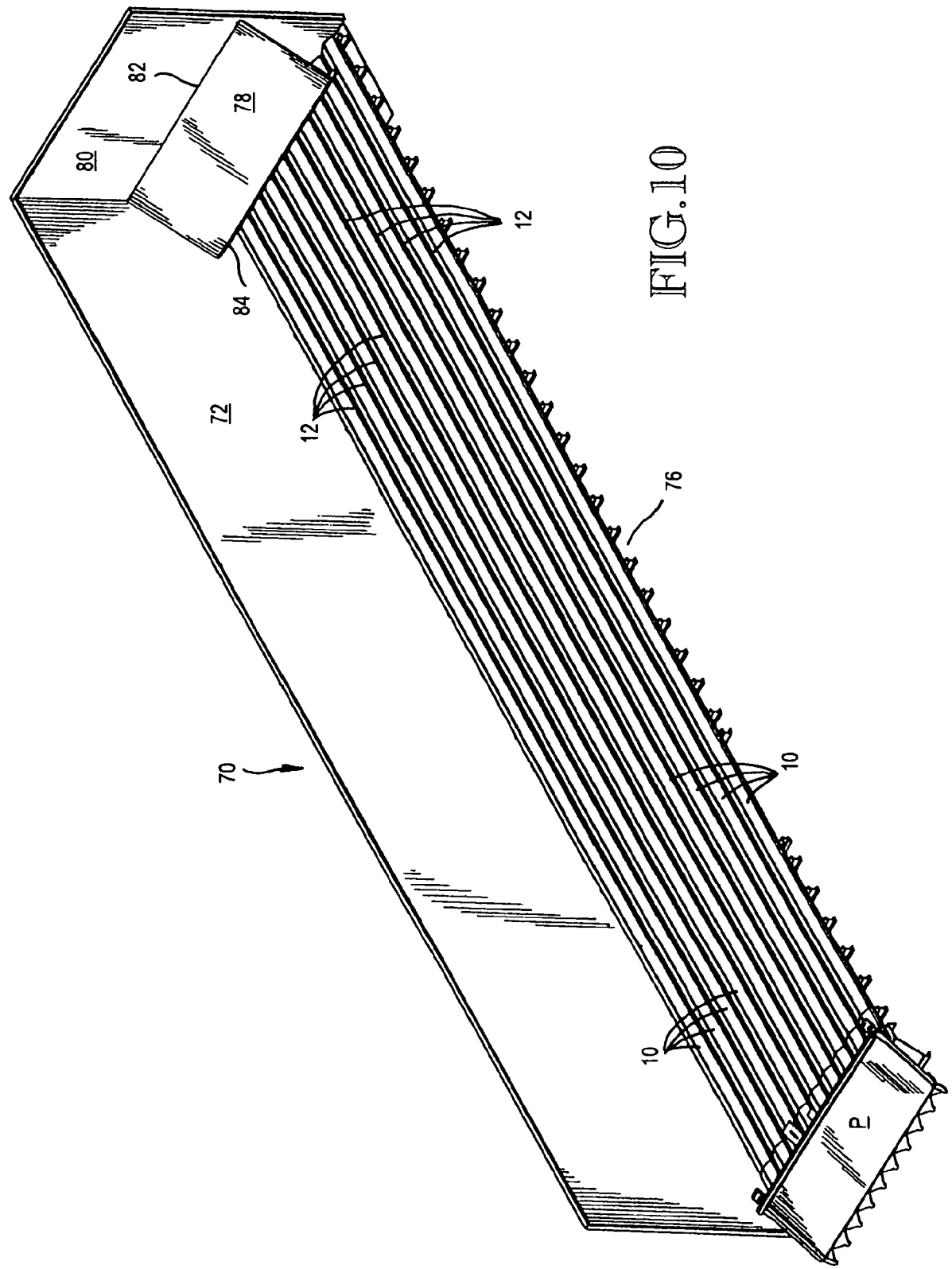
FIG. 10 is a pictorial view like FIGS. 1 and 7, but showing the cleaning plow at the rear end of the trailer, in a downwardly and rearwardly sloping during position.
Figure 11:
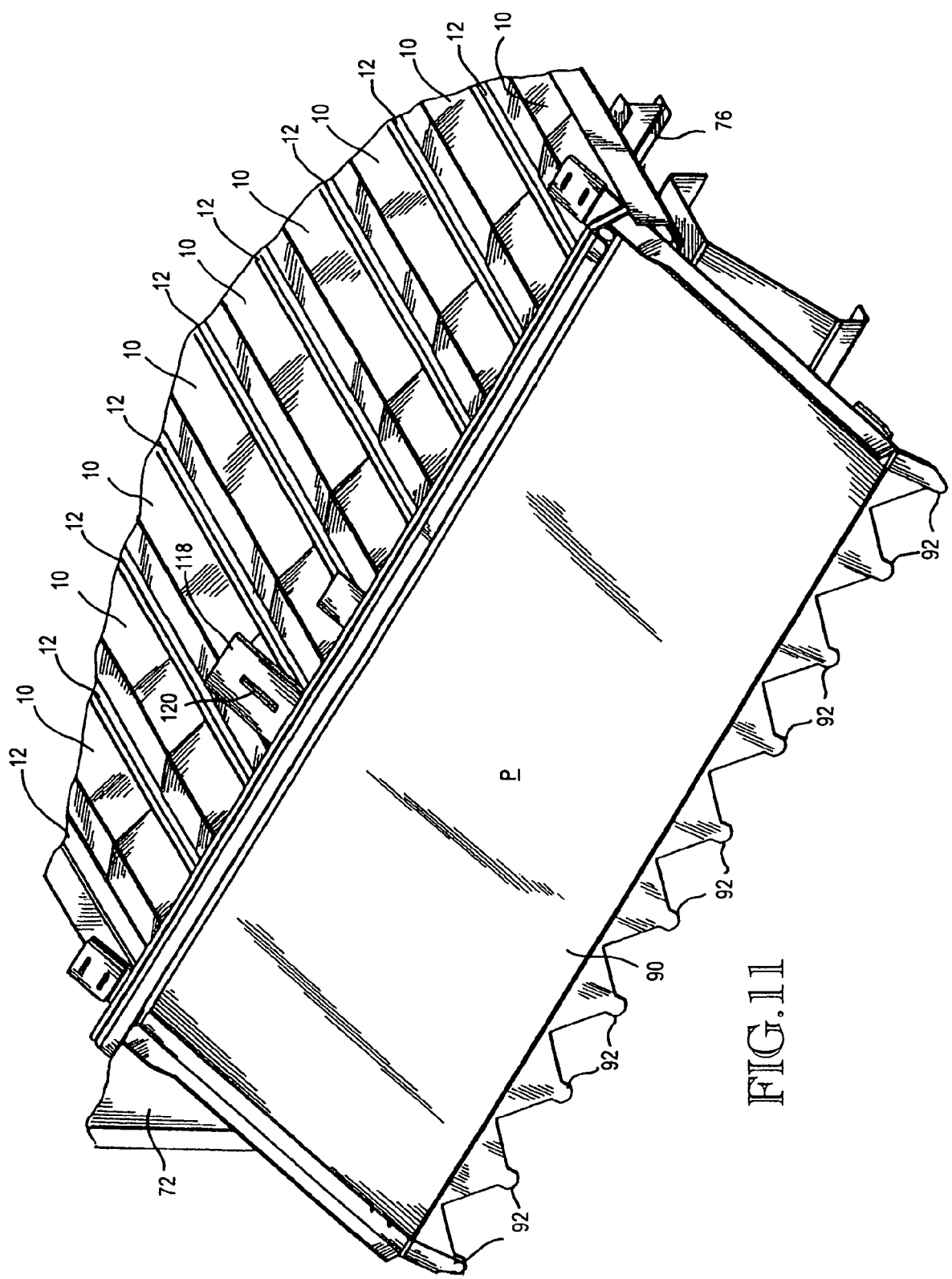
FIG. 11 is an enlarged scale view of the rear portion of FIG. 10.

FIG. 9 is an in view looking into the rear end of a trailer box 70 which includes an embodiment of the present invention. The trailer box 70 has a driver-side wall 72, a passenger-side wall 74 and a base structure 76 for the conveyor slats 10, 12. A baffle 78 is provided at the front end of the trailer box rearwardly of the front wall 80. FIGS. 1, 7 and 10 show the trailer box 70 with the passenger-side wall removed. In these figures and in FIGS. 2 and 3, the baffle 78 is shown to include a front edge 82 that is contact with the front wall 80 of the trailer box. Baffle 78 then slopes downwardly and rearwardly to a rear edge 84. As best shown by FIG. 3 the lower edge 84 is spaced above the conveyor slats 10 a distance d. The baffle 78 overhangs the rear portion of a cleanout plow P. As best shown by FIGS. 4 and 5, the plow has a main body 90 formed from sheet metal. The rear edge of body 90 is cut to form a plurality, of fingers 92. Preferably, the fingers 92 slope rearwardly and downwardly into the valley regions between the conveyor slats 10. Fingers 92 have edge portions that are contiguous the side walls of the valley regions. Preferably the fingers 92 are in the form of cantilever beams that are spring biased into contact with the valley regions forms by the slats 10, 12. Preferably, the downward slope of the fingers 92 is such that the rear ends of the fingers 92 will contact the fixed slats 12 before the body 90 makes contact with the peaks of the slats 10. Then, when material M (FIGS. 15-19) is placed on the body 90, the material will bend the fingers so that the body 90 will be moved downwardly into contact with the peaks of the slats 10. At the same time the edge portions of the fingers 90 will be biased against the contiguous surfaces of the valley regions formed between the slats 10.

Preferably, the plow P includes short side walls 96, 98 and a forward wall 100. Wall 100 may include a plurality of vertical slots 102. A rake 104 (FIG. 3) is attached to the wall 100 by bolts or other suitable fasteners that extend through the slats 102 and into the rake 104. The slots 102 and fasteners mount the rake 104 for vertical up and down movement. Rake 104 includes fingers 106 at its lower edge which extend downwardly into the valley regions formed by the conveyor slats 10. The fingers 106 have edges that are contiguous the surfaces of the moveable slats 10 and the fixed slats 12 which define the valley regions.

Figure 6:
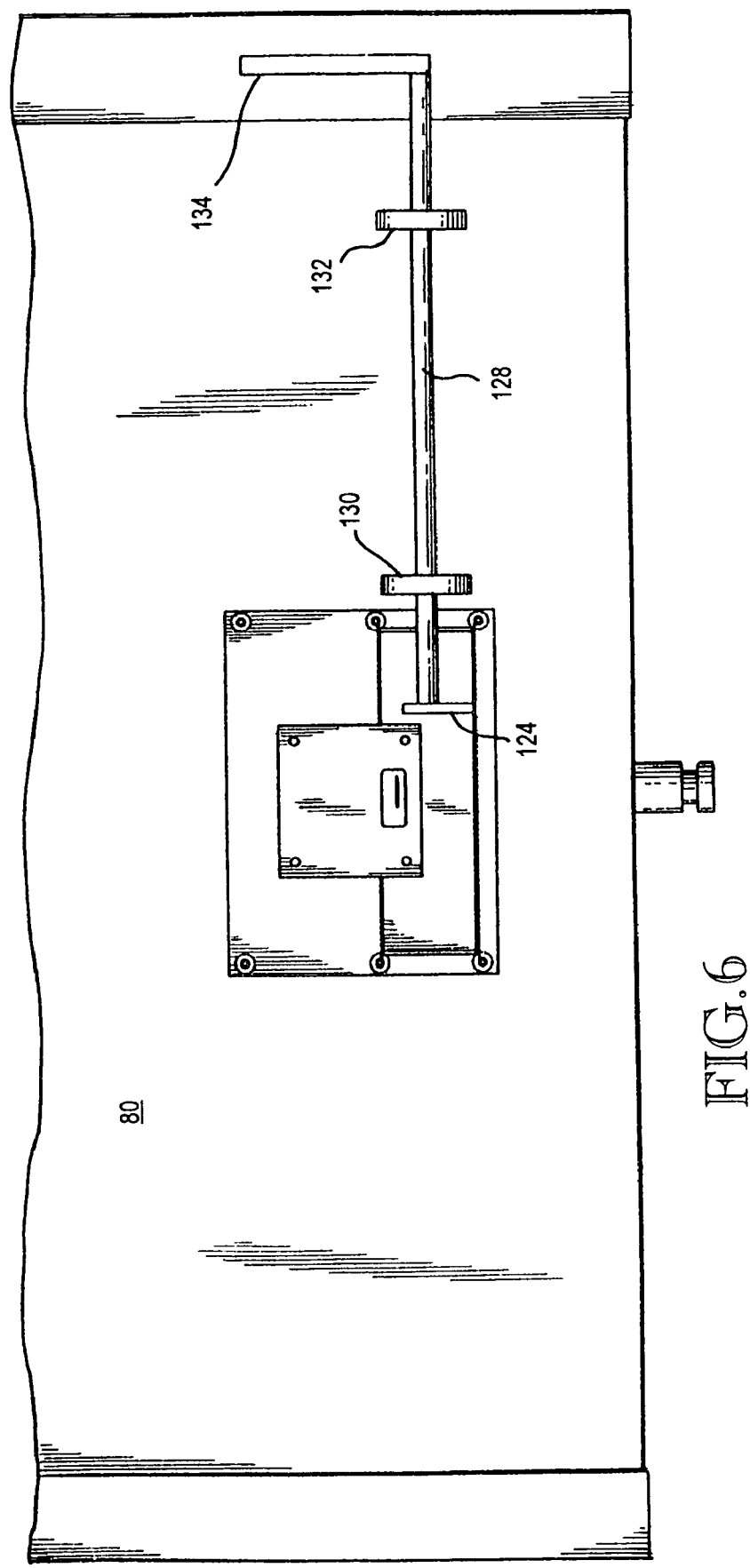
FIG. 6 is a sectional view taken substantially along line 6-6 of FIG. 3.

Referring to FIG. 5, the plow P may include slide bearing members 108, 110, 112 that set down on the peaks of the movable slats 10. Bearings 108, 110, 112 the body 90 of plow up from the moveable slats 10 and minimize the area of contact between the plow and the surfaces of the slats 10. As best shown by FIG. 3, the top portion of 114 of wall 104 is bent rearwardly and forms a hook region 116. A latch bar 118 is connected to and extends forwardly from the plow P. Bar 118 includes a slot 120 for receiving the hook portion 122 of a locking latch 124. As best shown by FIG. 3, the locking latch 124 is mounted for rotation about an axis 126. As shown by FIG. 6, the latch 124 may be connected to one end of rod 128. In FIG. 6, rod 128 is shown to be supported for rotation by a pair of laterally spaced apart bearings 130, 132 that are connected to the front wall 80 of the trailer. The latch 124 is at the inner end of rod 128 whereas a handle 134 is at the outer end of rod 128. FIG. 3 shows the latch 124 rotated into a position in which the hook 122 extends into the slot 120. In this position, the latch 124 holds the plow P in the position shown in FIG. 3. This is its forward "park" position. As can be seen and understood from FIG. 3, a rotation of the rod 128 in the counterclockwise direction will move the latch hook 122 up out of the slot 120, freeing in the plow P for movement rearwardly along the conveyor during operation of the conveyor.

In operation, all of the movable slats 10 are moved together in the rearward direction for moving with them any load L that is on the conveyor. When the cleaning plow P is unlocked, i.e. the latch 122 is moved up out of the slot 120, plow P will be moved by the slats 10 as they move rearwardly. As is well known, the moveable slats 10 are moved rearwardly in unison for a predetermined distance, e.g. one foot. Then, they are stopped. Next they are in sequence, moved forwardly to a start position ⅓ of the slats 10 at a time. As a set of the slats 10 is moving forwardly, the other two slats 10 are stationary. The load L is held by the area of the nonmoving slats 10 and the area of the fixed slats 12. This procedure is repeated with the second set of slat 10 and then again with the third set of slats 10. Then all of the slats are again moved rearwardly in unison for conveying the load an additional amount.

As best shown by FIG. 3, the baffle 78 diverts material that is dropped into the conveyor down onto the rear portion of the plow P, and onto the conveyor slats rearwardly of the plow P. FIG. 15 shows the plow P in a forward, "parked" position. It also shows the load L sitting down on the conveyor slats 10, 12 and the portion of the plow P that is rearwardly of the baffle 78. FIG. 16 shows the load L and the plow P moved rearwardly from the position shown by FIG. 15. FIG. 17 shows the load L and the plow P moved further rearwardly. Of course, as the load L moves rearwardly, its rear portion will drop off from the rear end of the conveyor. Eventually, the plow P will reach the rear end of the conveyor and will start to tip, as shown by FIG. 19. As the plow P moves further rearwardly, after it has started to tip, the hook portion 116 of the rear wall will contact a pair of stops S, one located at each side of the plow P. Stops S may be members that project laterally inwardly from the sidewalls 72, 74 of the trailer. See FIG. 9. Eventually, the plow P will move into the position shown by FIG. 20 and will be restrained from any further rearward movement by engagement by the hook region 116 and the stops S.

Preferably, a teather T extends forwardly from the plow P to an opening in wall 80, and through the opening to a winch (not shown) that may be mounted on or adjacent the front of the wall 80. The winch is adapted to allow the teather T to pay-off from it as the plow P moves rearwardly. Then, when the unloading operation is completed and it is desired to move the plow P back into its parked position, the winch is operated to pull on the teather T so that the teather T will in turn pull on the plow P and move it from the position shown by FIG. 20 back into the position shown by FIG. 15. By that time, the latch hook 122 will drop back into the slot 120 for locking the plow P in its parked position (FIG. 3).

Figure 23:
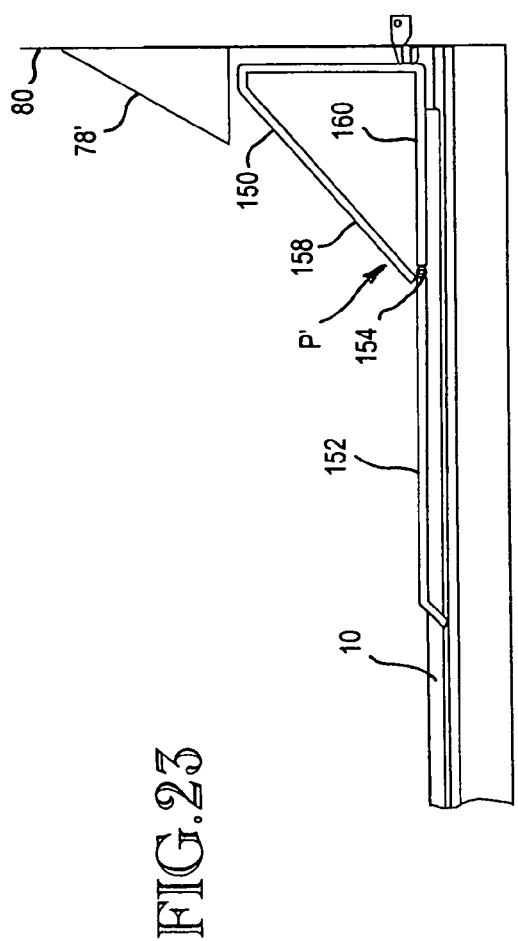
FIG. 23 is a schematic view looking towards the passenger side of the cleaning plow of FIGS. 21 and 22, when it is in a part position.
Figure 24:
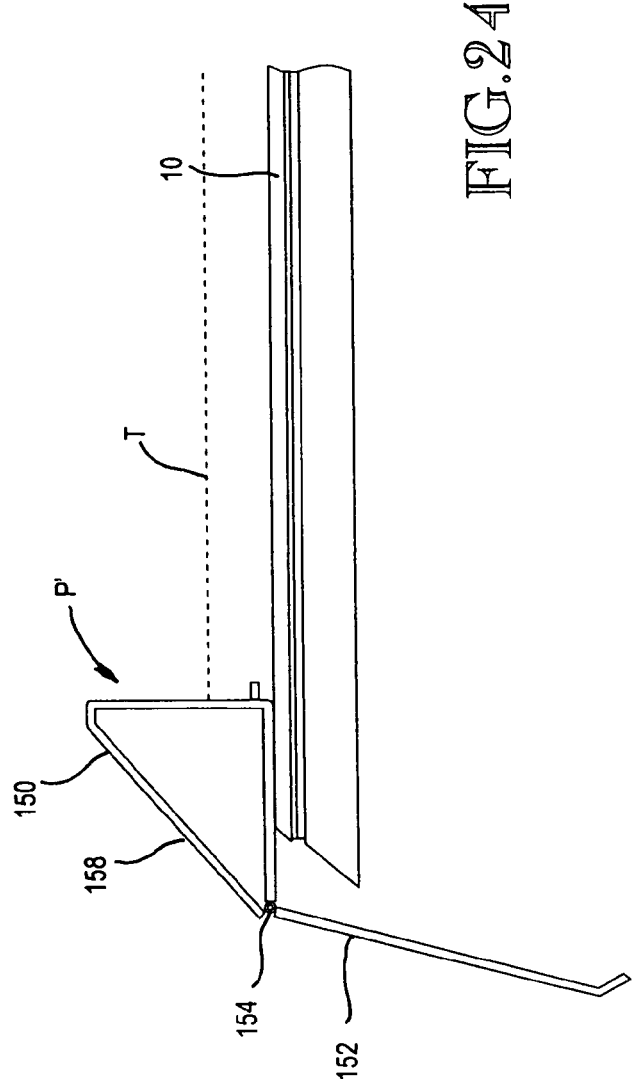
FIG. 24 is a view like FIG. 23, but showing the cleaning plow moved rearwardly to the rear end of the conveyor, and showing the rear portion of the cleaning plow swung downwardly for dumping from it the last portion of the load.

FIGS. 21-24 show a second embodiment of the invention characterized by the cleaning plow P' being separated into forward and rearward parts 150, 152 by a transverse hinge line 154 of any suitable construction. In this embodiment, the rearward portion of the cleaning plow P' includes fingers 156 which fit into the valley regions of the conveyor, between the movable slats 10. As best shown by FIG. 23, the forward portion 150 of the sweeping plow P' has a real wall 158 that slopes downwardly and rearwardly from its front end to its rear end where it intersects the hinge line 154. The baffle 78' on the front wall 80 of the trailer overhangs the forward portion of the wall 158 (FIG. 23). When material is dropped into the trailer box, some of it will contact the baffle 78' and slide down it onto the wall 158. Some of it will directly contact the wall 158 and slide downwardly from it onto the rear portion 152 of the cleaning plow P'. Also, some of the material will drop directly onto the rear portion 152 of the cleaning plow P'. The bottom 160 of the forward portion 150 rests on the tops of the conveyor slats 10. Also, the bottom of the rearward portion 152 of the sweeping plow P' rests on the tops of the conveyor slats 10. However, when the sweeping plow P' is moved to the rear end of the conveyor, the rear portion 152 of the conveyor plow P' will pivot in position around the hinge line 154, so that any material still on the rear portion 152 will be dumped by it off from the end of the conveyor.

Figure 25:
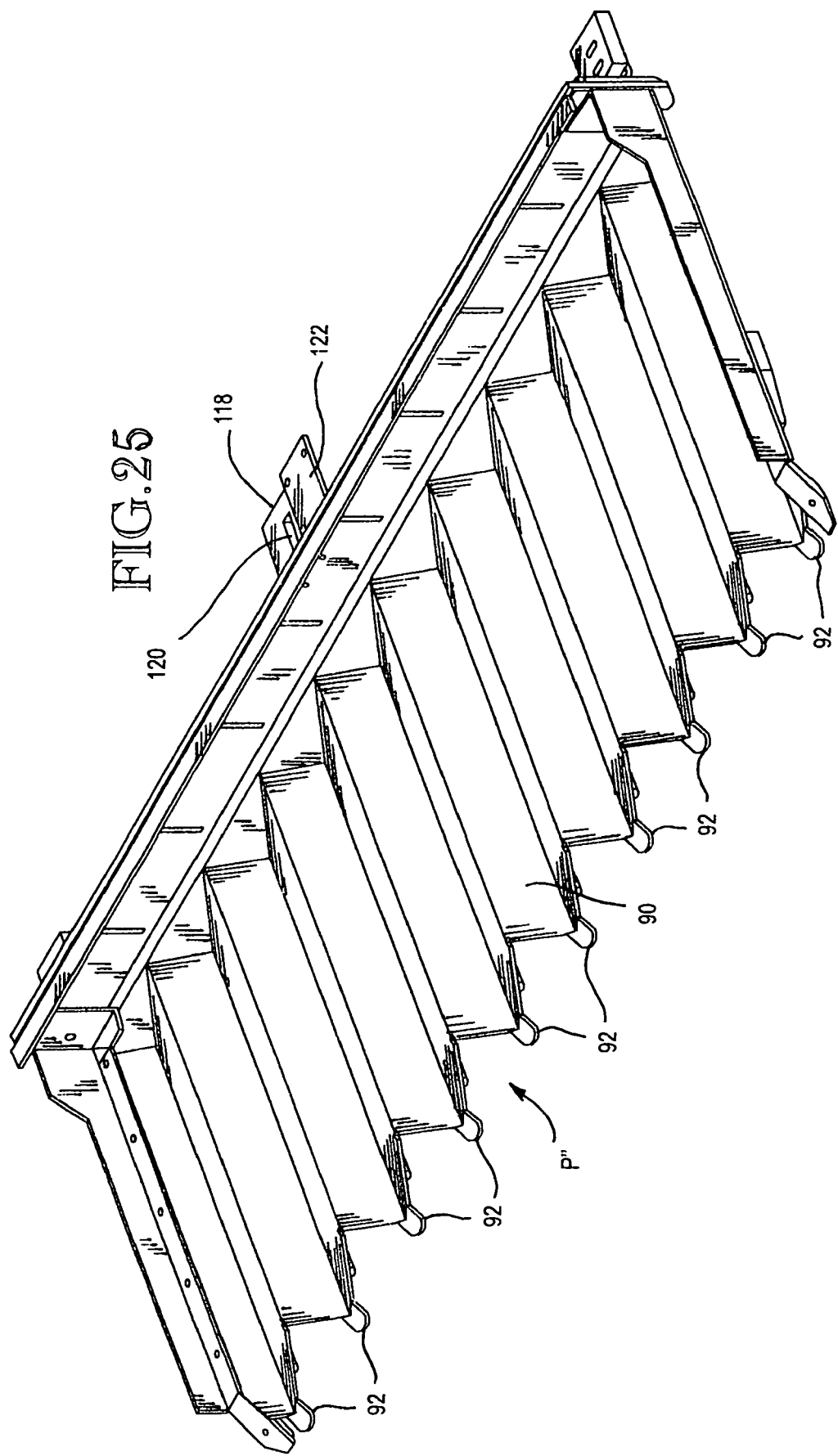
FIG. 25 is a pictorial view similar to FIG. 4, showing another embodiment of the sweeping plow in which the rear portion of the sweeping plow is formed with peaks and valleys that substantially conform to the peaks and valleys of the conveyor.

FIG. 25 shows another modification in the form of a sweeping plow P''' that is corrugated. It comprises peaks and valleys that closely conform to the peaks and valleys of the conveyor. The lower surface of a corrugated member may include bearings which contact the conveyor slats and reduce the amount of friction between the member and the conveyor slats. This embodiment preferably has fingers at its rear end such as the fingers showed in the embodiment that is described above in connection with FIGS. 1-20. This embodiment may have a side and front end construction such as shown in FIGS. 4 and 5, the main difference being that the member 90 shown in FIGS. 4 and 5 is corrugated.

The portions of the sweeping plows P''' that are contacted by the material that is dropped into the trailer box is preferably constructed from steel plate or a strong and tough aluminum alloy. However, any suitable material may be used so long as it can take a force of the material being dropped onto it.

The illustrated embodiments are only examples of the present invention and, therefore, are non-limitive. It is be understood that many changes in the particular structure, material and feature of the invention made be made without departing from the spirit and scope of the invention. Therefore, it is my intention that my patent rights not be limited by the particular embodiments that are illustrated and described herein, but rather are to be determined by the following claims, interpreted according to accepted doctrines of patent claim interpretation, including use doctrine of equivalents and reversal of parts.

The invention claimed is:

1. A reciprocating slat conveyor, comprising:
a plurality of laterally spaced apart movable conveyor slats separated by valley regions;
each said movable conveyor slat having side portions that slope outwardly and downwardly from peaks; and
a cleaning plow comprising a rigid body extending across the conveyor and supported by the movable conveyor slats;
said body having front and rear ends;
fingers adapted to extend downwardly from the body into the valley regions between the slats; and
wherein movement of the movable conveyor slats in a conveying direction will move the cleaning plow in the conveying direction;
wherein at least one of said ends includes fingers adapted to extend downwardly from the body into the valley regions between the slats.

2. The conveyor of claim 1, wherein the rear end of the plow includes fingers adapted to extend downwardly from the plow body into the valley regions between the slats.

3. The conveyor of claim 2, wherein the plow includes fingers that slope downwardly and rearwardly from the plow body and have side and bottom edges that are adapted to be contiguous side and bottom surfaces of the valley regions when the plow is on the conveyor.

4. The conveyor of claim 1, wherein the front end of the plow includes fingers that are adapted to extend downwardly into the valley regions.

5. The conveyor of claim 4, wherein the fingers have side and bottom edges that are adapted to be contiguous side and bottom surfaces of the valley regions when the plow is on the conveyor.

6. The conveyor of claim 2, wherein the rear end of the plow includes fingers that are adapted to extend downwardly into the valley regions.

7. The conveyor of claim 6, wherein the fingers at the rear end of the plow slope downwardly and rearwardly from the plow body and have side and bottom edges that are adapted to be contiguous side and bottom surfaces of the valley regions when the plow is on the conveyor.

8. The conveyor of claim 1, wherein the rigid body has a substantially horizontal central portion between the front end fingers and the rear end fingers.

9. The conveyor claim 8, wherein the front end of the plow includes a substantially vertical wall and the fingers at the front end of the plow are formed on a lower portion of the vertical wall, below the central portion of the plow.

10. The conveyor of claim 8, wherein the fingers at the rear end of the plow slope downwardly and rearwardly from the plow body and have side and rear edges that are adapted to be contiguous side and bottom surfaces of the valley regions when the plow is on the conveyor.

11. The conveyor of claim 1, wherein the reciprocating slat conveyor has a rear end portion and at least one stop adjacent the rear end portion; and
wherein the cleaning plow has a front end portion positioned to contact the stop when the cleaning plow is at the rear of the conveyor; and
wherein when the front end portion of the cleaning plow is in contact with the stop, the cleaning plow has a portion that extends rearwardly form the rear end of the conveyor and slopes outwardly and downwardly form the rear end of the conveyor.

12. The conveyor of claim 11, wherein the cleaning plow has a front end wall including a rear surface and it is this surface that contacts the stop.

13. The conveyor of claim 11, wherein the rear end of the plow includes fingers adapted to extend downwardly from the plow body into the valley regions between the slats.

14. The conveyor of claim 13, wherein the plow includes fingers that slope downwardly and rearwardly from the plow body and have side and bottom edges that are adapted to be contiguous side and bottom surfaces of the valley regions when the plow is on the conveyor.

15. The conveyor of claim 13, wherein the rear end of the plow includes fingers that are adapted to extend downwardly into the valley regions.

16. The conveyor of claim 15, wherein the fingers at the rear end of the plow slope downwardly and rearwardly from the plow body and have side and bottom edges that are adapted to be contiguous side and bottom surfaces of the valley regions when the plow is on the conveyor.

17. The conveyor of claim 11, wherein the front end of the plow includes fingers that are adapted to extend downwardly into the valley regions.

18. The conveyor of claim 17, wherein the fingers have side and bottom edges that are adapted to be contiguous side and bottom surfaces of the valley regions the plow is on the conveyor.

19. The conveyor of claim 11, wherein the rigid body has a substantially horizontal central portion between the front end fingers and the rear end fingers.

20. The conveyor of claim 19, wherein the front end of the plow includes a substantially vertical wall and the fingers at the front end of the plow are formed on a lower portion of the vertical wall, below the central portion of the plow.

21. The conveyor of claim 19, wherein the fingers at the rear end of the plow slope downwardly and rearwardly from the plow body and have side and rear edges that are adapted to be contiguous side and bottom surfaces of the valley regions when the plow is on the conveyor.

22. The conveyor of claim 11, wherein the reciprocating slat conveyor has a rear end portion and at least one stop adjacent the rear end portion; and wherein the cleaning plow has a front end portion positioned to contact the stop when the cleaning plow is at the rear of the conveyor; and wherein when the front end portion of the cleaning plow is in contact with the stop, the cleaning plow has a portion that extends rearwardly from the rear end of the conveyor and slopes downwardly from the rear end of the conveyor.

23. The conveyor of claim 22, wherein the cleaning plow has a front end wall including a rear surface and it is this surface that contacts the stop.

24. A reciprocating slat conveyor, comprising:

a front wall including a downwardly and rearwardly sloping baffle;

a plurality of laterally spaced apart movable conveyor slats separated by valley regions;

said baffle having a rear edge spaced above the conveyor slats;

each said movable conveyor slat having side portions that slope outwardly and downwardly from peaks; and a cleaning plow comprising a rigid body extending across the conveyor and supported by the movable conveyor slats;

said body having front and rear ends;

fingers adapted to extend from the body into the valley regions between the slats; and wherein movement of the movable conveyor slats in a conveying direction will move the cleaning plow in the conveying direction;

wherein at least one of said ends includes fingers adapted to extend downwardly from the body into the valley regions between the slats; and wherein the plow is fittable under the rear edge of the baffle with a rear portion of the baffle projecting rearwardly from the rear edge of the baffle.

25. The conveyor of claim 24, wherein the rear end of the plow includes fingers adapted to extend downwardly form the plow body into the valley regions between the slats.

26. The conveyor of claim 25, wherein the plow includes fingers that slope downwardly and rearwardly from the plow body and have side and bottom edges that are adapted to be contiguous side and bottom surfaces of the valley regions when the plow is on the conveyor.

27. The conveyor of claim 25, wherein the rear end of the plow includes fingers that are adapted to extend downwardly into the valley regions.

28. The conveyor of claim 27, wherein the fingers at the rear end of the plow slope downwardly and rearwardly from the plow body and have side and bottom edges that are adapted to be contiguous side and bottom surfaces of the valley regions when the plow is on the conveyor.

29. The conveyor of claim 24, wherein the front end of the plow includes fingers that are adapted to extend downwardly into the valley regions.

30. The conveyor of claim 29, wherein the fingers have side and bottom edges that are adapted to be contiguous side and bottom surfaces of the valley regions when the plow is on the conveyor.

31. The conveyor of claim 24, wherein the rigid body has a substantially horizontal central portion between front end fingers and rear end fingers.

32. The conveyor of claim 31, wherein the front end of the plow includes a substantially vertical wall and the fingers at the front end of the plow are formed on a lower portion of the vertical wall, below the central portion of the plow.

33. The conveyor of claim 31, wherein the fingers at the rear end of the plow slope downwardly and rearwardly from the plow body and have side and rear edges that are adapted to be contiguous side and bottom surfaces of the channels when the plow is on the conveyor.

34. The conveyor of claim 24, wherein the reciprocating slat conveyor has a rear end portion and at least one stop adjacent the rear end portion; and wherein the cleaning plow has a front end portion positioned to contact the stop when the cleaning plow is at the rear of the conveyor; and wherein when the front end portion of the cleaning plow is in contact with the stop, the cleaning plow has a portion that extends rearwardly from the rear end of the conveyor and slopes outwardly and downwardly from the rear end of the conveyor.

35. The conveyor of claim 34, wherein the cleaning plow has a front end wall including a rear surface and it is this surface that contacts the stop.

36. The conveyor of claim 34, wherein the rear end of the plow includes fingers adapted to extend downwardly from the plow body into the valley regions between the slats.

37. The conveyor of claim 36, wherein the plow includes fingers that slope downwardly and rearwardly from the plow body and have side and bottom edges that are adapted to be contiguous side and bottom surfaces of the valley regions when the plow is on the conveyor.

* * * * *